US009807599B1

(12) United States Patent
Schanker et al.

(10) Patent No.: US 9,807,599 B1
(45) Date of Patent: Oct. 31, 2017

(54) MANAGEMENT OF WIRELESS COMMUNICATION DEVICES BY A MOBILE CONTROL DEVICE

(71) Applicant: Sprint Communications Company L.P., Overland Park, KS (US)

(72) Inventors: Samuel L. Schanker, Overland Park, KS (US); Dante A. Puliatti, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 51 days.

(21) Appl. No.: 14/132,949

(22) Filed: Dec. 18, 2013

(51) Int. Cl.
H04M 3/00 (2006.01)
H04W 8/22 (2009.01)
H04W 64/00 (2009.01)

(52) U.S. Cl.
CPC ........... *H04W 8/22* (2013.01); *H04W 64/003* (2013.01)

(58) Field of Classification Search
CPC ..... H04W 8/245; H04W 8/265; H04W 4/021; H04W 4/22; H04M 1/72525; H04M 2207/18; H04M 3/42178; H04M 1/72536; H04M 2201/50; H04M 2203/306; H04M 2242/04; H04M 2242/30; H04M 3/567; H04L 67/306; G06Q 50/265; G08B 13/196; H04N 7/147
USPC ......... 455/419, 456.1–456.6, 457, 67.12, 73, 455/404.2
See application file for complete search history.

(56) References Cited

U.S. PATENT DOCUMENTS

| | | | |
|---|---|---|---|
| 6,243,449 B1 | 6/2001 | Margulis et al. | |
| 7,006,472 B1 | 2/2006 | Immonen et al. | |
| 7,460,515 B1 | 12/2008 | Chowdhury et al. | |
| 8,264,958 B1 | 9/2012 | Pankajakshan | |
| 8,340,110 B2 | 12/2012 | Gast | |
| 8,378,817 B2* | 2/2013 | Fox | 340/540 |
| 8,538,393 B1* | 9/2013 | Beyer et al. | 455/414.2 |
| 2004/0203989 A1* | 10/2004 | Karaoguz | 455/522 |
| 2005/0079858 A1* | 4/2005 | Rosen et al. | 455/411 |
| 2007/0149178 A1* | 6/2007 | Thorson | H04W 8/265 455/414.1 |
| 2007/0281689 A1* | 12/2007 | Altman | G06Q 30/0207 455/435.1 |
| 2008/0070593 A1* | 3/2008 | Altman et al. | 455/457 |

(Continued)

*Primary Examiner* — Kathy Wang-Hurst
*Assistant Examiner* — B. M. M Hannan

(57) ABSTRACT

Systems, methods, and software that enable a mobile control device to manage wireless communication devices. The mobile control device receives a user-type instruction indicating a user-type and a map instruction indicating a geographic area. In response to receiving these instructions, the mobile control device displays on a touch display a geographic map indicating the wireless communication devices of the selected user-type that are located within the selected geographic area. The user touches the display through the geographic map to select some wireless communication devices of the selected user-type within the selected geographic area. The mobile control device receives an activation instruction for the selected ones of the wireless communication devices and in response, wirelessly transferring an activation message indicating the activation instruction for the selected ones of the wireless communication devices for delivery to and execution by a wireless network control system.

16 Claims, 4 Drawing Sheets

(56) References Cited

U.S. PATENT DOCUMENTS

| | | | |
|---|---|---|---|
| 2010/0240350 A1* | 9/2010 | Ilkanaev | H04M 1/72552 |
| | | | 455/419 |
| 2012/0039452 A1* | 2/2012 | Horn | H04L 63/083 |
| | | | 379/188 |
| 2012/0044938 A1 | 2/2012 | He | |
| 2013/0012239 A1* | 1/2013 | Crowley | H04L 12/58 |
| | | | 455/456.3 |
| 2013/0148752 A1* | 6/2013 | Kumhyr | 375/259 |
| 2015/0009327 A1* | 1/2015 | Love | 348/148 |
| 2015/0195769 A1* | 7/2015 | Cormier | H04L 63/10 |
| | | | 370/230 |

* cited by examiner

MANAGEMENT OF WIRELESS COMMUNICATION DEVICES BY A MOBILE CONTROL DEVICE

TECHNICAL BACKGROUND

Wireless communication devices have a wide range of form factors. Some form factors may be suitable for outdoor use. A team of field workers may carry wireless communication devices that network with each other over a radio access network, such as cellular, Wi-Fi, or mesh. The radio access network carries communications between wireless communications devices and application servers. Network communication likely uses Internet Protocol and perhaps involves the Internet.

A wireless communication device may have a touch display, as does a phablet. A display may show a geographic map marked up to reveal important objects within a vicinity. The geo-location or geo-position, identity, and attributes of important objects may be reported by a remote service. The display of various subsets of objects upon a geographic map can be toggled according to meaningful criteria. Touch gestures such as dragging enable direct manipulation of objects drawn on a map. Touch gestures can manipulate the map to pan and zoom and multi-select objects on the map.

Some wireless communications regard device control functions or network control functions, which can affect the services of some wireless communication devices. Direct control of communication resources can impact quality of service. The availability of some features may depend on user authentication and authorization.

Wireless communication devices may stream live data such as video and other sensor input. When multiple wireless communication devices stream at least live audio to each other, a voice conference is possible. A person acting as a dispatcher may use voice calls to interact with field workers. The supervisory nature of the dispatcher role is suited to a larger display size, as available on a laptop or phablet. A field worker with preoccupied hands might instead need a smaller device such as a cell phone or walkie-talkie. An emergency responder in an extreme environment may need a rugged communication device that is head mounted or otherwise wearable and hands free.

TECHNICAL OVERVIEW

Systems, methods, and software that enable a mobile control device to manage wireless communication devices. The mobile control device receives a user-type instruction indicating a user-type and a map instruction indicating a geographic area. In response to receiving these instructions, the mobile control device displays on a touch display a geographic map indicating the wireless communication devices of the selected user-type that are located within the selected geographic area. The user touches the display through the geographic map to select some wireless communication devices of the selected user-type within the selected geographic area. The mobile control device receives an activation instruction for the selected ones of the wireless communication devices and in response, wirelessly transferring an activation message indicating the activation instruction for the selected ones of the wireless communication devices for delivery to and execution by a wireless network control system.

DETAILED DESCRIPTION

Figure 1:
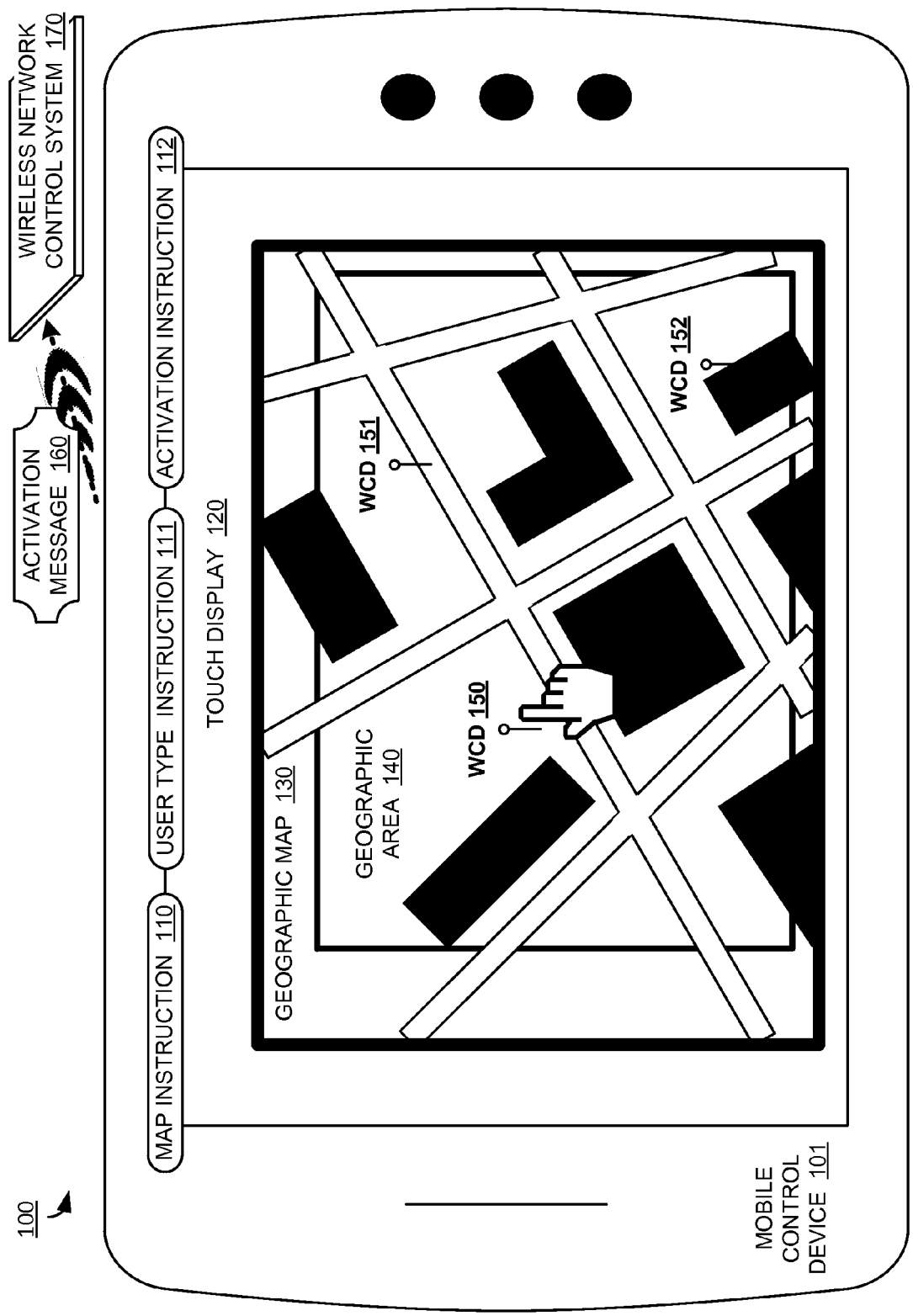
FIG. 1 illustrates a communication system that controls wireless communication devices.

FIG. 1 illustrates communication system 100 that controls wireless communication devices. Wireless communication system 100 includes mobile control device 101, activation message 160, and wireless network control system 170. Mobile control device 101 may be a tablet, a smart phone, a laptop, or any other wireless communication device with a touch display. Mobile control device 101 enables a user to manage wireless communication devices that are present within a geographic area. Mobile control device 101 includes touch display 120, and possibly other hardware input devices for user entry of instructions 110-112, such as a microphone, keyboard, or mouse. Some instructions may be spoken or touch gestures. Only activation instruction 112 requires user interaction. Instructions 110-111 may occur automatically.

Much of the content displayed on touch display 120 is determined by instructions 110-111. Map instruction 110 declares geographic area 140, such as the scene of an emergency. Map instruction 110 may require user entry, perhaps of a street address, or may occur automatically such as when the GPS location of mobile control device 101 is automatically obtained. User type instruction 111 restricts by category of user which wireless communication devices are indicated as being present within geographic area 140.

Mobile control device 101 reacts to instructions 110-111 by showing geographic map 130 which includes geographic area 140. In this example geographic map 130 shows part of a city grid with streets and buildings. Wireless communication system 100 uses instructions 110-111 to determine which wireless communication devices should be visually indicated as present within geographic area 140. The contents of geographic map 130 and the determination of which devices to indicate is likely accomplished by remote servers such as wireless network control system 170 or some other wireless communication device tracking system.

Wireless communications devices that match the criteria given by instructions 110-111 are indicated by pins or any other visual indication meaningfully positioned within geographic area 140. Those matching wireless communication devices in this example are wireless communications devices 150-152, each shown as a pin stuck in a street, building, or elsewhere. The user interacts with touch display 120 to select an interesting subset of indicated wireless communication devices. In this example the user accomplishes that by individually touching some indicated wireless communication devices, as shown by the hand in FIG. 1. Other implementations may use any touch gestures that perform selection of multiple indicated wireless communication devices.

What happens to the selected wireless communication devices depends on activation instruction 112 which may be user entered or automatic. In some implementations activation instruction 112 may involve the user choosing from a menu of predetermined choices. Activation instruction 112 may be a command to activate or deactivate a given feature or mode on the selected wireless communication devices. For example activation instruction 112 may be a command to initiate a conference voice call involving the selected wireless communication devices and likely also involving mobile control device 101 itself.

Mobile control device 101 accomplishes the activation instruction by wirelessly transmitting activation message 160 for delivery to wireless network control system 170, although this does not require a direct wireless link between mobile control device 101 and network control system 170. Activation message 160 includes an indication of activation instruction 112, which also identifies the selected wireless communication devices to be affected. After receiving activation message 160, wireless network control system 170 executes activation instruction 112 for the selected wireless communication devices.

Figure 2:
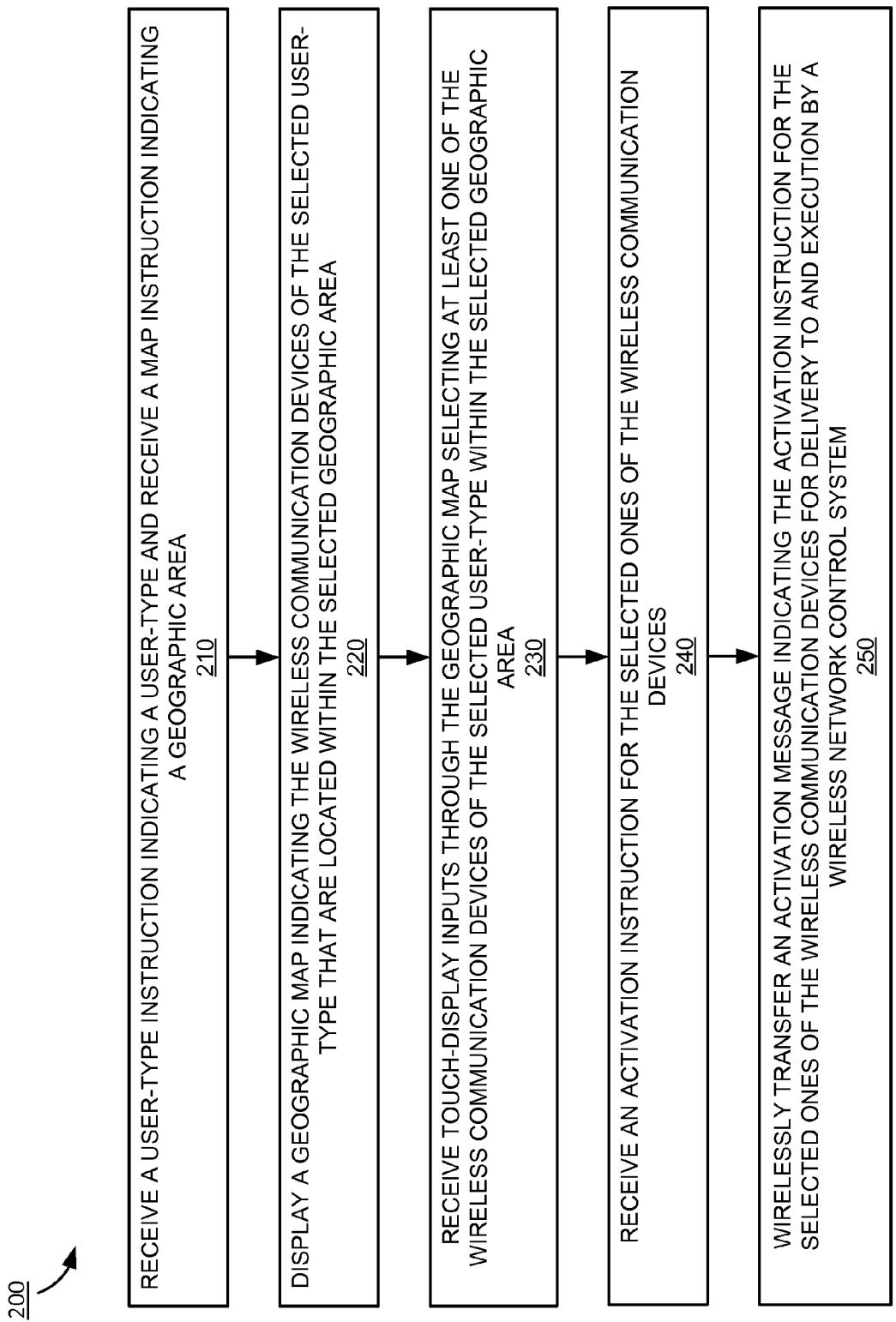
FIG. 2 illustrates the behavior of a mobile control device.

The states and operations involved with controlling wireless communication devices in communication system 100 are illustrated as behaviors 200 in FIG. 2. Mobile control device 101 receives (210) user-type instruction 111 indicating a user-type and map instruction 110 indicating geographic area 140. In response mobile control device 101 displays (220) geographic map 130 indicating the wireless communication devices of the selected user-type that are located within geographic area 140. With touch gestures on geographic map 130 displayed on touch display 120, the user selects (230) at least one of the wireless communication devices of the selected user-type within geographic area 140. Mobile control device 101 receives (240) activation instruction 112 for the selected ones of the wireless communication devices. In response mobile control device 101 wirelessly transfers (250) activation message 160 indicating activation instruction 112 for the selected ones of the wireless communication devices for delivery to and execution by wireless network control system 170.

Figure 3:
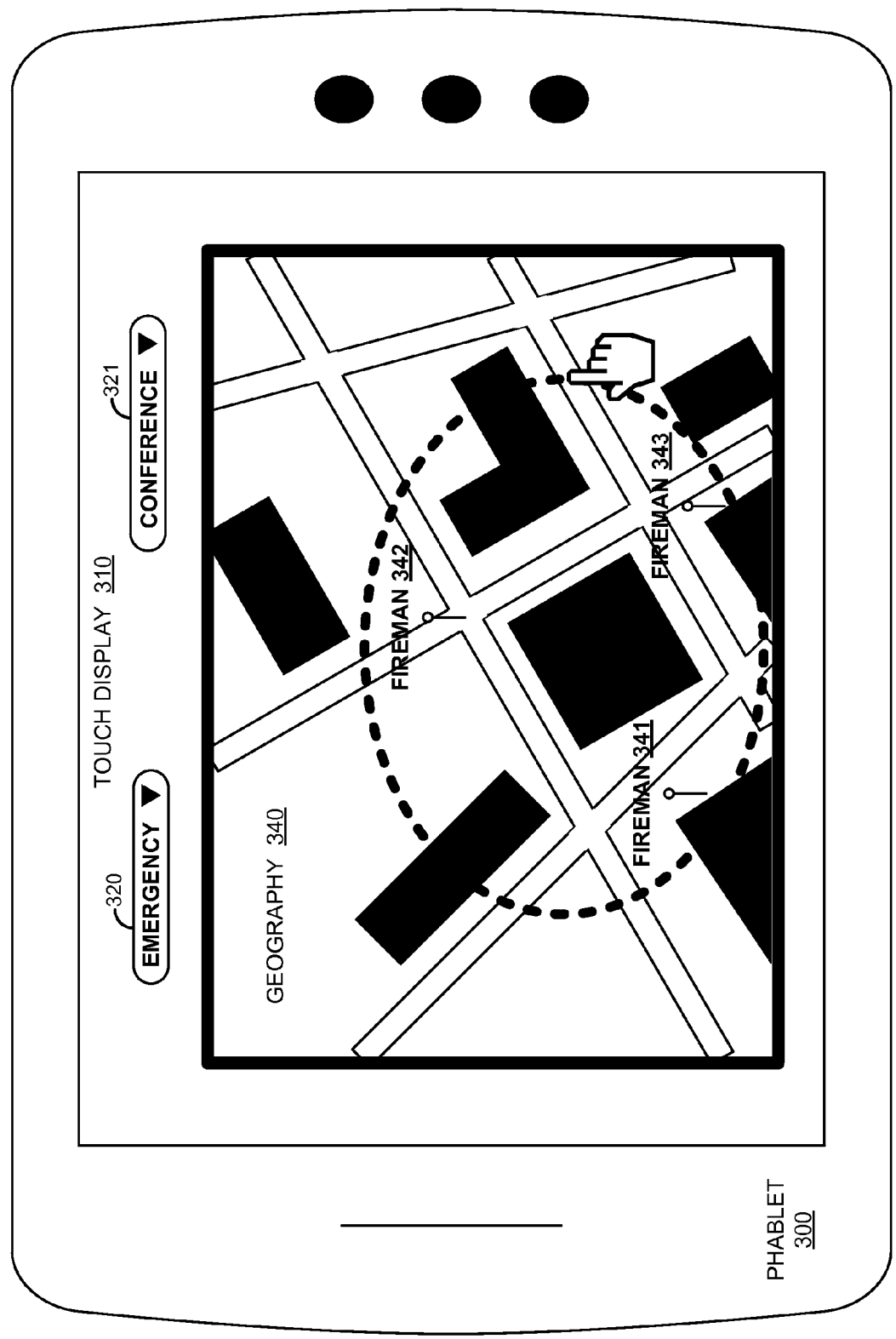
FIG. 3 illustrates a mobile control device.

FIG. 3 illustrates phablet 300 which is an implementation of mobile control device 100 used by a fire department field chief during a factory explosion emergency within a city. The fire chief is nearby in a truck parked in a busy intersection. The fire chief can use phablet 300 to initiate a voice conference call between the fire chief and a team of firefighters who surround the building.

Phablet 300 is running geographical mapping software that displays geography 340 on touch display 310. Geography 340 serves as geographic map 130 and geographic area 140 of FIG. 1, because in this implementation geographic map 130 is automatically clipped to be the same size as geographic area 140. Geography 340 automatically pans to wherever be the current location of phablet 300. Geography 340 also supports pinch-to-zoom and panning by dragging.

Although other response workers are on scene, such as police, and utility personnel, the fire chief chooses "EMERGENCY" in combobox 320 so that geography 340 shows pins only of the cell phones that her team are carrying. Other choices in combobox 320 allow display of pins only of police, electrical utility personnel, water utility personnel, or gas utility personnel. In this example choosing "EMERGENCY" causes phablet 300 to place pins on geography 340 indicating only cell phones 341-343. The fire chief recognizes the pin for cell phone 342 as representing her own cell phone. To include herself and the rest of her team in a conference call, she lasso selects their pins by dragging her finger around pins 341-343 while touching geography 340, as shown by the hand and a dashed circle surrounding the pins. Another implementation might use rubber band selection instead of lasso selection, which involves a diagonal gesture rather than a circular one to encompass the desired pins.

A conference call begins when "CONFERENCE" is finally chosen in combobox 321 as shown. An implementation of phablet 300 may implicitly include itself in the conference call that it initiates, even if phablet 300 is not within geography 340. Each firefighter wears a helmet with a rugged camera phone mounted on the underside of the visor and used as a head camera capable of voice calls and transmitting live video. Although not shown combobox 321 includes more choices such as an audible retreat alert and receiving live video.

Although not shown a police chief is with the fire chief. Both chiefs are biometrically authenticated by phablet 300 as authorized users. The police chief knows that during rush hour a cellular base station may become saturated with users. Since the response workers communicate with each other over the same cellular network as the general public, during an emergency the police chief can use phablet 300 to dedicate base station capacity to response workers. This can be accomplished with comboboxes 320-321. Although not shown combobox 321 has two choices that respectively allow or disallow wireless communications by cell phones whose pins are selected. Combobox 320 has an additional choice to display pins for the phones of non-responders. By using comboboxes 320-321 a chief can grant wireless service to response workers on the scene and temporarily deny service to other cell phones that are also at the scene.

Figure 4:
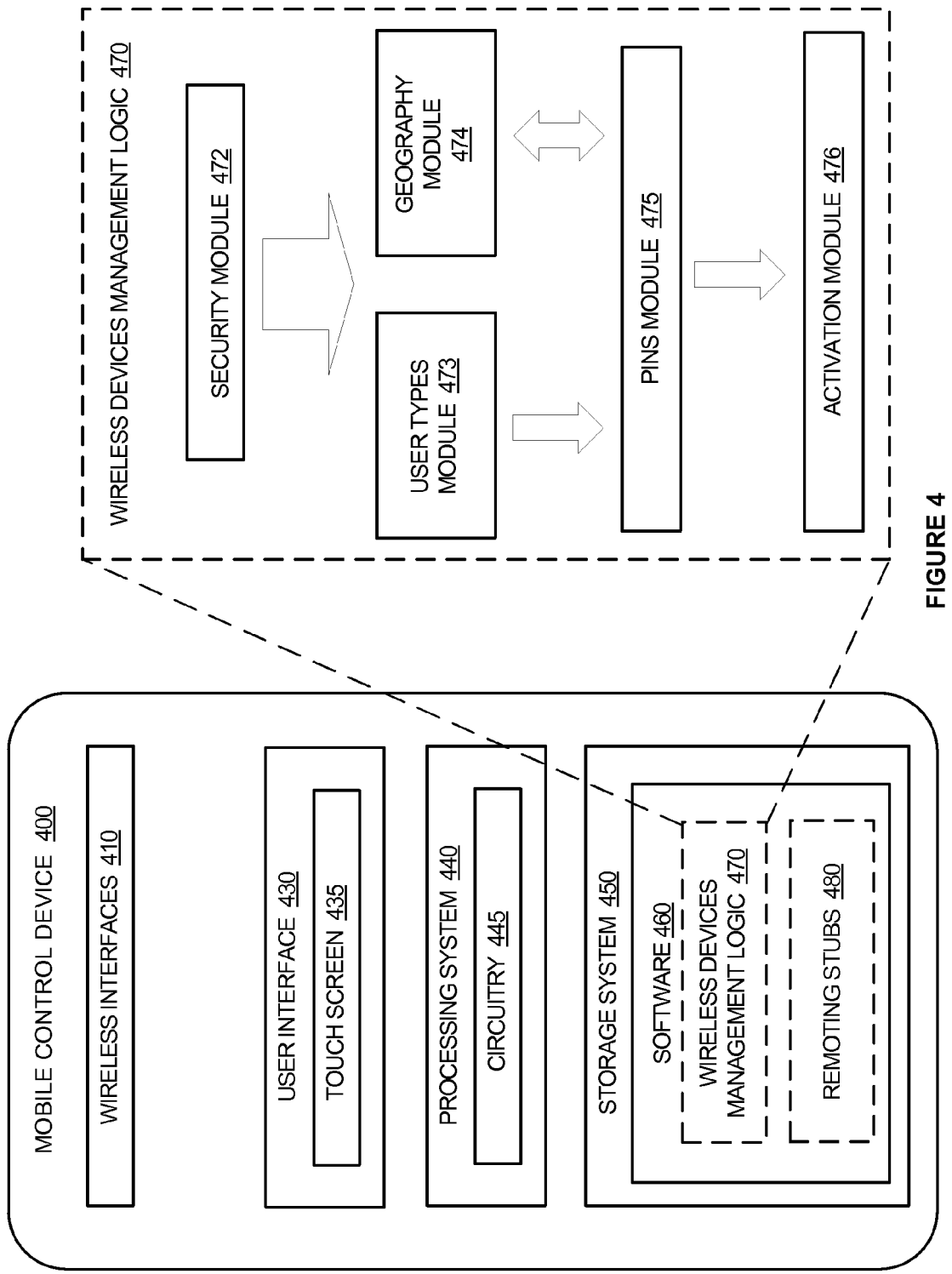
FIG. 4 illustrates a mobile control device.

FIG. 4 illustrates mobile control device 400, which is an example internal configuration of mobile control device 101 and phablet 300, although those wireless devices could use alternative configurations. Mobile control device 400 comprises wireless interface 410, user interface 430, processing system 440, and storage system 450. Processing system 440 is linked to wireless interfaces 410 and user interface 430. Processing system 440 includes processing circuitry 445 which is connected to storage system 450 that stores operating software 460. Mobile control device 400 may include other well-known components such as a power supply and enclosure that are not shown for clarity. Mobile control device 400 may be a smart phone, phablet, tablet, hand-held or wearable console, laptop, or some other wireless processing device with a touch display.

Mobile control device 400 uses at least one of wireless interfaces 410 as a packet transceiver. Wireless interfaces 410 comprises RF communication circuitry and antenna system. The RF communication circuitry typically includes an amplifier, filter, RF modulator, and signal processing circuitry. Wireless interfaces 410 may also include a memory device, software, processing circuitry, or some other communication device.

Processing circuitry 445 comprises microprocessor and other circuitry that retrieves and executes operating software 460 from storage system 450. Storage system 450 comprises a non-transitory storage medium, such as a disk drive, flash drive, data storage circuitry, or some other memory apparatus. Processing circuitry 445 is typically mounted on a circuit board that may also hold storage system 450 and portions of management interface 410, backhaul interface 420, and OFDMA interface 430. Operating software 460 comprises computer programs, firmware, or some other form of machine-readable processing instructions. Operating software 460 includes wireless devices management logic 470, which is an implementation of the states and operations illustrated in FIG. 2 tailored according to desired features. Operating software 460 may also include an operating system, utilities, drivers, network interfaces, applications, or some other type of software. When executed by processing circuitry 445, operating software 460 directs processing system 440 to operate mobile control device 400 as described herein and in accordance with wireless devices management logic 470.

The implementation of wireless devices management logic 470 may be an aggregation of modules such as those shown in FIG. 4. Security module 472 controls the availability of user interface 430 by performing authentication and authorization. When security module 472 allows access, a user may search for matching wireless communication devices on the scene of an emergency. A search for devices at an emergency is narrowed and initiated according to user types module 473 and geography module 474, which may receive user input from touch screen 435. The search for on-scene devices is performed directly by pins module 475 or delegated to a remote service through remoting stubs 480 and out wireless interfaces 410. Pins module 475 directs geography module 474 to mark matching devices on a displayed geographic map. Pins module 475 also monitors user multi-selection of some matching devices. Activation module 476 directs remoting stubs 480 to send an activation message out through wireless interfaces 410. Implementations of wireless devices management 470 have flexibility as to how many logic modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobile control device to manage wireless communication devices, the method comprising:
   in the mobile control device, receiving a selection for a user-type and receiving a map instruction indicating a geographic area map, selecting a geographic area on the geographic area map, and in response, displaying the geographic area map indicating multiple wireless communication devices of the selected user-type that are located within the selected geographic area;
   in the mobile control device, receiving touch-display inputs through the geographic area map selecting at least one of the multiple wireless communication devices of the selected user-type within the selected geographic area;
   in the mobile control device, receiving an activation instruction indicating a command to at least allow or block wireless communications between other wireless communication devices that are in the selected geographic area and the selected at least one of the multiple wireless communication devices and in response, wirelessly transferring an activation message indicating the activation instruction for the selected at least one of the multiple wireless communication devices for delivery to a wireless network control system.

2. The method of claim 1 wherein:
   the user-type indicates an emergency personnel user-type;
   displaying the geographic map comprises indicating the wireless communication devices of emergency personnel that are located within the selected geographic area;
   receiving the touch-display inputs comprises identifying ones of the wireless communication devices of the emergency personnel within the selected geographic area.

3. The method of claim 1 wherein:
   the user-type indicates a law enforcement personnel user-type;
   displaying the geographic map comprises indicating the wireless communication devices of law enforcement personnel that are located within the selected geographic area;
   receiving the touch-display inputs comprises identifying ones of the wireless communication devices of the law enforcement personnel within the selected geographic area.

4. The method of claim 1 wherein:
   the user-type indicates an electrical utility personnel user-type;
   displaying the geographic map comprises indicating the wireless communication devices of electrical utility personnel that are located within the selected geographic area;
   receiving the touch-display inputs comprises identifying ones of the wireless communication devices of the electrical utility personnel within the selected geographic area.

5. The method of claim 1 wherein:
   the user-type indicates a water utility personnel user-type;
   displaying the geographic map comprises indicating the wireless communication devices of water utility personnel that are located within the selected geographic area;
   receiving the touch-display inputs comprises identifying ones of the wireless communication devices of the water utility personnel within the selected geographic area.

6. The method of claim 1 wherein:
   the user-type indicates a gas utility personnel user-type;
   displaying the geographic map comprises indicating the wireless communication devices of gas utility personnel that are located within the selected geographic area;
   receiving the touch-display inputs comprises identifying ones of the wireless communication devices of the gas utility personnel within the selected geographic area.

7. The method of claim 1 wherein:
   receiving the activation instruction further comprises receiving a command to open wireless communications between the mobile control device and the selected ones of the wireless communication devices;
   wirelessly transferring the activation message further comprises indicating the command to open the wireless communications between the mobile control device and the selected ones of the wireless communication devices.

8. The method of claim 1 wherein:
   receiving the activation instruction further comprises receiving a command for the selected ones of the wireless communication devices to capture and report data;
   wirelessly transferring the activation message further comprises indicating the command for the selected ones of the wireless communication devices to capture and report the data.

9. A mobile control device to manage wireless communication devices, the mobile control device comprising:
   a graphic display configured to receive a selection for a user-type and receive a map instruction indicating a geographic area map, selecting a geographic area on the geographic area map;
   a processing system configured to obtain geographic map data indicating multiple wireless communication devices of the selected user-type that are located within the selected geographic area;

the graphic display configured to display the geographic area map of the geographic map data, receive touch-display inputs selecting at least one of the multiple wireless communication devices of the selected user-type within the selected geographic area, and receive an activation instruction indicating a command to at least allow or block wireless communications between other wireless communication devices that are in the selected geographic area and the selected at least one of the multiple wireless communication devices;

the processing system configured to direct a wireless transfer of an activation message indicating the activation instruction for the selected at least one of the multiple wireless communication devices for delivery to a wireless network control system.

10. The mobile control device of claim 9 wherein the user-type indicates an emergency personnel user-type, the graphic display configured to display the geographic map comprises indicating the wireless communication devices of emergency personnel that are located within the selected geographic area, and the graphic display configured to receive touch-display inputs comprises identifying ones of the wireless communication devices of the emergency personnel within the selected geographic area.

11. The mobile control device of claim 9 wherein the user-type indicates a law enforcement personnel user-type, the graphic display configured to display the geographic map comprises indicating the wireless communication devices of law enforcement personnel that are located within the selected geographic area, and the graphic display configured to receive touch-display inputs comprises identifying ones of the wireless communication devices of the law enforcement personnel within the selected geographic area.

12. The mobile control device of claim 9 wherein the user-type indicates an electrical utility personnel user-type, the graphic display configured to display the geographic map comprises indicating the wireless communication devices of electrical utility personnel that are located within the selected geographic area, and the graphic display configured to receive touch-display inputs comprises identifying ones of the wireless communication devices of the electrical utility personnel within the selected geographic area.

13. The mobile control device of claim 9 wherein the user-type indicates a water utility personnel user-type, the graphic display configured to display the geographic map comprises indicating the wireless communication devices of water utility personnel that are located within the selected geographic area, and the graphic display configured to receive touch-display inputs comprises identifying ones of the wireless communication devices of the water utility personnel within the selected geographic area.

14. The mobile control device of claim 9 wherein the user-type indicates a gas utility personnel user-type, the graphic display configured to display the geographic map comprises indicating the wireless communication devices of gas utility personnel that are located within the selected geographic area, and the graphic display configured to receive touch-display inputs comprises identifying ones of the wireless communication devices of the gas utility personnel within the selected geographic area.

15. The mobile control device of claim 9 wherein the graphic display configured to receive the activation instruction further comprises receiving a command to open wireless communications between the mobile control device and the selected ones of the wireless communication devices, and the processing system configured to direct the wireless transfer of the activation message further comprises indicating the command to open the wireless communications between the mobile wireless control device and the selected ones of the wireless communication devices.

16. The mobile control device of claim 9 wherein the graphic display configured to receive the activation instruction further comprises receiving a command for the selected ones of the wireless communication devices to capture and report data, and the processing system configured to direct the wireless transfer of the activation message further comprises indicating the command for the selected ones of the wireless communication devices to capture and report the data.

\* \* \* \* \*